US010915607B2

(12) United States Patent
Boivin

(10) Patent No.: US 10,915,607 B2
(45) Date of Patent: Feb. 9, 2021

(54) METHOD FOR PROVIDING A LICENCE IN A SYSTEM FOR PROVIDING MULTIMEDIA CONTENTS

(71) Applicant: VIACCESS, Paris la Défense (FR)

(72) Inventor: Mathieu Boivin, Aulnay-sous-Bois (FR)

(73) Assignee: VIACCESS, Paris la Défense (FR)

( * ) Notice: Subject to any disclaimer, the term of this patent is extended or adjusted under 35 U.S.C. 154(b) by 377 days.

(21) Appl. No.: 14/911,079

(22) PCT Filed: Aug. 4, 2014

(86) PCT No.: PCT/EP2014/066678
§ 371 (c)(1),
(2) Date: Feb. 9, 2016

(87) PCT Pub. No.: WO2015/018775
PCT Pub. Date: Feb. 12, 2015

(65) Prior Publication Data
US 2016/0180064 A1    Jun. 23, 2016

(30) Foreign Application Priority Data
Aug. 9, 2013   (FR) ..................... 13 57946

(51) Int. Cl.
*G06F 21/10*       (2013.01)
*H04N 21/6334*    (2011.01)
(Continued)

(52) U.S. Cl.
CPC ....... *G06F 21/105* (2013.01); *H04N 21/2541* (2013.01); *H04N 21/25816* (2013.01);
(Continued)

(58) Field of Classification Search
USPC ......................................... 726/28
See application file for complete search history.

(56) References Cited

U.S. PATENT DOCUMENTS 7,765,305 B2 *   7/2010  Smith ................ H04L 12/66
                                                   709/203
7,991,908 B2 *   8/2011  Drogo de Iacovo .................
                                              H04L 29/06027
                                                   709/232
(Continued)

FOREIGN PATENT DOCUMENTS

WO    WO 00/21239     4/2000
WO    WO 00/58811    10/2000
(Continued)

*Primary Examiner* — Sharif E Ullah
(74) *Attorney, Agent, or Firm* — Occhiuti & Rohlicek LLP

(57) ABSTRACT

A method for providing a licence includes: a step a) wherein a server receives a request including an identifier of a multimedia content and an identifier of a terminal or of a user. The server computes the licence including at least one access data needed by the terminal to access the multimedia content. Before step a), there is a step e) for obtaining a first recommendation list for the user and from the list, obtaining one multimedia content identifier. For each automatically selected identifier, the method includes pre-computing at least one access data, and in a step b), searching for the identifier of the multimedia content received in step a) from among the identifiers automatically selected in the step e). In the event of success, the method includes selecting the pre-computed access data corresponding to the identifier, and, in the event of failure, generating the access data.

11 Claims, 2 Drawing Sheets

(51) Int. Cl.
    *H04N 21/8355*    (2011.01)
    *H04N 21/258*     (2011.01)
    *H04N 21/658*     (2011.01)
    *H04N 21/254*     (2011.01)

(52) U.S. Cl.
    CPC . *H04N 21/25875* (2013.01); *H04N 21/25891* (2013.01); *H04N 21/63345* (2013.01); *H04N 21/6581* (2013.01); *H04N 21/8355* (2013.01); *G06F 2221/0768* (2013.01)

(56) References Cited

U.S. PATENT DOCUMENTS

| | | | | |
|---|---|---|---|---|
| 2003/0005135 | A1* | 1/2003 | Inoue | 709/229 |
| 2005/0193414 | A1* | 9/2005 | Horvitz | H04N 21/482 725/46 |
| 2005/0235307 | A1* | 10/2005 | Relan | H04N 21/25875 725/14 |
| 2007/0168665 | A1* | 7/2007 | Kim | H04L 12/2803 713/171 |
| 2009/0106110 | A1* | 4/2009 | Stannard | G06F 17/30 705/14.1 |
| 2009/0208016 | A1* | 8/2009 | Choi | G06Q 20/3829 380/277 |
| 2011/0047080 | A1* | 2/2011 | Im | G06F 21/10 705/59 |
| 2011/0047615 | A1* | 2/2011 | Chou | G06F 21/10 726/19 |
| 2011/0191859 | A1* | 8/2011 | Naslund | G06F 21/10 726/27 |
| 2013/0013748 | A1* | 1/2013 | Leighton | G06F 17/3089 709/219 |
| 2016/0286245 | A1* | 9/2016 | Lugeon | H04N 21/2347 |

FOREIGN PATENT DOCUMENTS

| | | |
|---|---|---|
| WO | WO 2009/087549 | 7/2009 |
| WO | WO 2011/138333 | 11/2011 |

* cited by examiner

US 10,915,607 B2

1

METHOD FOR PROVIDING A LICENCE IN A SYSTEM FOR PROVIDING MULTIMEDIA CONTENTS

RELATED APPLICATIONS

This application is a U.S. National Stage of international application number PCT/EP2014/066678 filed Aug. 4, 2014, which claims the benefit of the priority date of French Patent Application FR 1357946, filed Aug. 9, 2013, the contents of which are herein incorporated by reference.

FIELD OF INVENTION

The invention relates to a method for providing a licence in a system for providing multimedia contents. The invention also relates to a method for computing a licence, for the implementation of this method. The invention finally relates to a licence server and an information storage medium for the implementation of this method.

BACKGROUND

The system for providing multimedia contents being considered is any support system of any service for providing on-line multimedia contents to a plurality of user terminals.

A user terminal is a terminal associated with this user, i.e. an identifier of which is stored in relation to an identifier of this user. Here this storage is static, resulting from an input prior to the use of the terminal by the user. For example, it follows the declaration, by the operator of the service or by the user, that the latter is owner of the terminal.

A terminal is used by a user of the system for providing multimedia contents to access a multimedia content. Here, accessing a multimedia content means playing it in clear, storing it, or making any other use of it offered by the system for providing multimedia contents.

The multimedia content provided is audiovisual contents, for example television programmes, or audio-only contents, for example a radio programme, or more generally any digital contents containing video and/or audio such as an informatic application, a game, a slide show, an image or any set of data.

Such a multimedia content, particularly when it is subject to rights such as copyright or related rights, is typically provided encrypted in conformance with its protection by a digital rights management (or DRM) system. This encryption is typically performed by means of a so-called content key, by a symmetric algorithm.

The terminology of the field of digital rights management systems is thus used in the remainder of this document. Readers interested in the subject can find a more comprehensive description in the following documents, for example:

Relating to the general architecture of a DRM system: DRM Architecture, Draft version 2.0, OMA-DRM-ARCH-V2_0-20040518-D, Open Mobile Alliance, 18 May 2004

Relating more specifically to licences: DRM Specification, Draft version 2.1, OMA-TS-DRM-DRM-V2_1-20060523-D, Open Mobile Alliance, 23 May 2006.

In such a digital rights management system, a licence allows a user terminal to access a multimedia content.

Of a structure well known to those skilled in the art, this licence contains at least one access data needed by this terminal to access the multimedia content. This access data depends on an identifier of the multimedia content and on an identifier of the user or of a terminal of the user, at the most. Thus, each access data is associated, by an injective or bijective relationship, with a single pair of identifiers, each pair of identifiers being formed by:

the identifier of the multimedia content, and
the identifier of the user or of a terminal of the user.

An access data is typically:

an access rule, which describes the uses of the multimedia content that the terminal of the user is authorized to make, or a content key, required for the decrypting of the multimedia content by a decryption algorithm, symmetric for example.

The content key is generally inserted into the licence in the form of a cryptogram obtained by encryption of the content key with a key specific to the terminal.

The computing of each licence therefore requires considerable resources from the licence server, notably for executing potentially complex cryptographic algorithms.

In such a system for providing multimedia contents, a terminal wishing to access a multimedia content must therefore have obtained the necessary licence. This licence can for example be obtained following an event such as:

the user with which the terminal is associated taking out a subscription, a renewal of this subscription, purchase of the multimedia content by the user, or a request by the terminal to access the multimedia content.

Such an event gives rise to the submission of a request for a licence to a licence server included in the system, then, in response, to the computing and provision of the corresponding licence to the terminal by this server.

Such a system for providing multimedia contents generally includes a large number of user terminals. In this context, its licence server is therefore liable to be subject to load peaks, in terms of the number of licence requests to be processed, and of computing resources required for this purpose, at certain periods, for example those devoted to the renewal of subscriptions, or upon the insertion of eagerly awaited content into the service catalogue.

Moreover, the nature of the services offered by such a system for providing multimedia contents implies an uneven temporal distribution of the licence requests. Indeed, in the case of television services, and more precisely services of "on demand" type, it is known that purchases of multimedia content, or requests to access this content, and therefore the licence requests submitted to the licence server, are more numerous at certain periods of the day, mainly at the moments when the majority of the users are in a position to use the system. This fact further increases the risk of the licence server being subject to the load peaks mentioned previously.

The potential complexity of computing a licence, noted previously, also increases this risk.

The identified risk of peaks in the load of the licence server threatens the capacity of this server to send the required licences, in a limited time in such a way as to avoid penalizing the quality of service.

It is therefore particularly beneficial to limit this risk.

The prior art is also known from:

WO0058811A2,

WO0021239A1.

SUMMARY OF INVENTION

The invention aims to increase the capacity of the licence server to send the required licences in a limited time.

The subject of the invention is thus a method for providing a licence in accordance with Claim 1.

In such a method, the operation of pre-computing at least one access data for a licence, in the step e) prior to the step a) of receiving the licence request, makes it possible, in the step b), to select the pre-computed data item without having to generate it at that time, and therefore to lighten the computing load of the licence server in response to the receiving of the licence request, if the required licence is the licence for which said access data has been pre-computed.

In such a method, the obtaining of the first recommendation list for the user, and the selection, from this first list, of the content identifiers used for the pre-computing operation, make it possible to increase the probability that the licence required in the step a) will be among those for which an access data has been pre-computed in the step e). Thus, the probability of the lightening of the computing load of the licence server potentially procured by the pre-computing operation occurring is increased. The first recommendation list is indeed characterized as containing a limited number of multimedia content identifiers from among a larger set of multimedia contents available in the system, the multimedia contents identified by this first list having a higher probability of being accessed by the terminal of the user than the other multimedia contents of the larger set.

The embodiments of this method for providing a licence can include the feature of Claim 2.

These embodiments of this method for providing a licence furthermore have the following advantage:

the operations of transmission, to the terminal or to another terminal of the user, of the first or of a second recommendation list constructed for this user and of display, by the or said other terminal of the user, of this first or second recommendation list, make it possible to favour the selection by the user of one of the multimedia content identifiers for which the access data has been pre-computed.

Another subject of the invention is a method for computing, via an electronic licence server, for the implementation of the method above by way of, a licence.

The embodiments of this method for computing a licence can include one or more of the features of the dependent claims of the computing method.

These embodiments of this method for computing a licence furthermore have the following advantages:

the operations of computing the workload of the licence server and of inhibiting or triggering the step e), depending on the computed workload, make it possible to not trigger the step e) of the method if the computed workload is already excessive, and therefore to not further aggravate the load peak.

Another subject of the invention is an information storage medium including instructions for executing the step e) of the above method for computing a licence, when these instructions are executed by an electronic computer.

A final subject of the invention is a licence server including an electronic computer programmed to trigger and execute the step e) of the above method for computing a licence.

The invention will be better understood upon reading the following description, given solely by way of non-limiting example, and made with reference to the drawings.

DETAILED DESCRIPTION

In the figures, the same references are given when denoting the same elements.

In the remainder of this description, the features well known to those skilled in the art are not described in detail.

Figure 1:
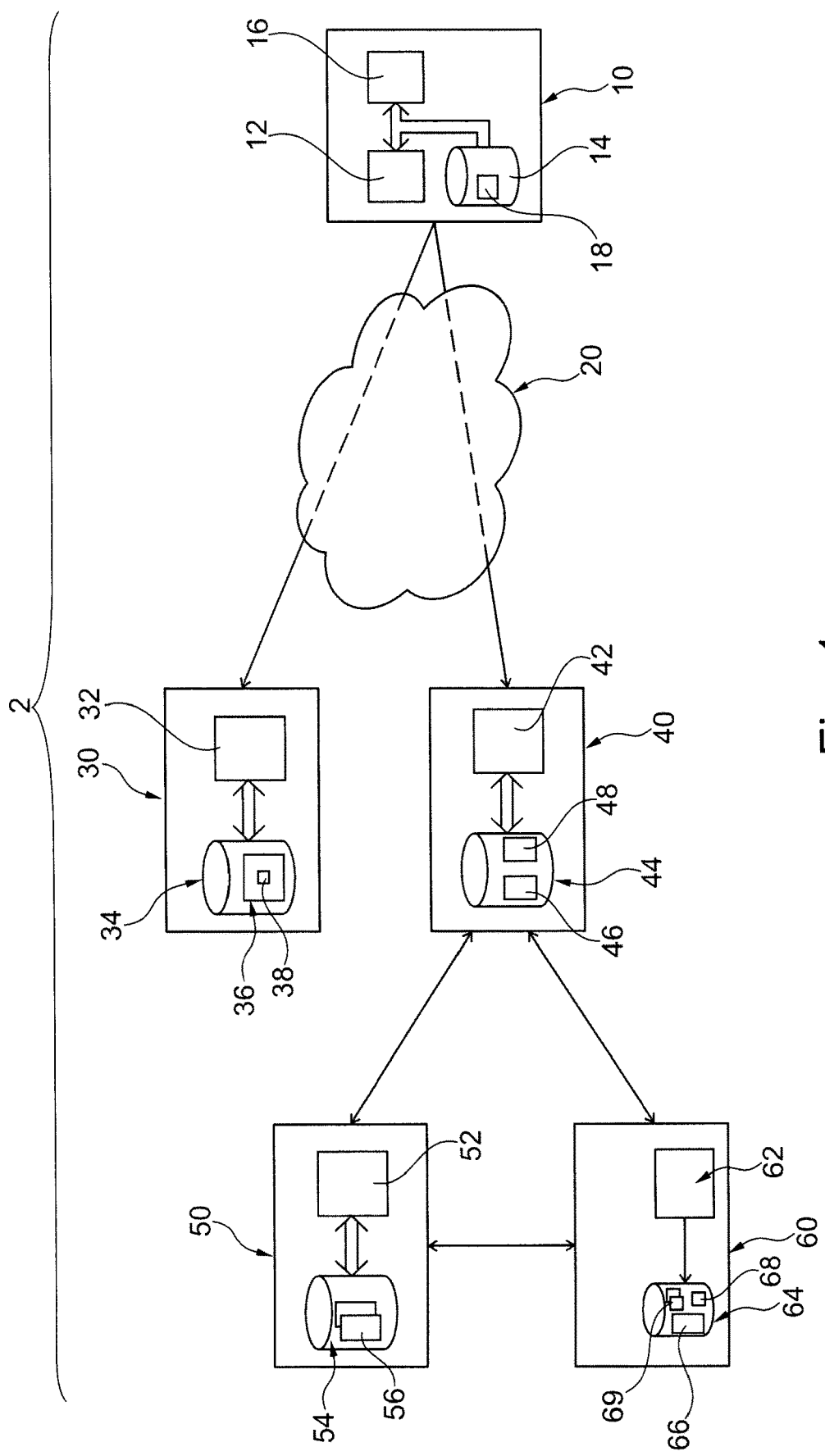
FIG. 1 is a schematic representation of the architecture of a system for providing multimedia contents.

FIG. 1 represents a system 2 for providing multimedia contents for the implementation of a method for providing a licence.

This system 2 comprises a plurality, typically thousands, of user terminals, linked, by way of a network 20, on the one hand to a server 30 of multimedia content, and on the other hand to a service gateway 40. Here, it is supposed that all these user terminals are identical. Thus, to simplify the illustration, only one terminal 10 is represented in FIG. 1.

The terminal 10 includes a programmable electronic computer 12, a memory 14 and a human-machine interface 16. The computer 12 is capable of executing instructions stored in the memory 14. The memory 14 includes the instructions needed to execute the method in FIG. 2. Moreover, the memory 14 includes a terminal identifier 18. This identifier 18 uniquely identifies the terminal 10 from among all the user terminals of the system 2.

The human-machine interface 16 typically comprises a screen and a remote control making it possible to select a particular area of the screen.

The network 20 is a long-distance information distribution network making it possible to establish two-way communication between any one of the terminals of the system 2 and the gateway 40 and the server 30. For example, the network 20 is the world-wide web, better known by the name of "Internet network".

The server 30 allows any terminal of the system 2 to obtain, for example by downloading, an item of encrypted multimedia content. For this purpose, the server 30 includes a programmable electronic computer 32 and a memory 34. The computer 32 is capable of executing instructions stored in the memory 34. The memory 34 notably contains the instructions needed to execute the method in FIG. 2. This memory 34 also contains a library 36. This library contains the multimedia content that each terminal can download over the network 20. In this library 36, the multimedia content is stored in encrypted form. each multimedia content is obtained by encrypting the multimedia content in clear using its own cryptographic key $K_c$ and a symmetric encryption algorithm. Thus, the key $K_c$ used to encrypt a multimedia content can only be used to decrypt this multimedia content and not any other. "In clear" denotes a multimedia content that can be reproduced by a terminal in a way that is perceptible and directly comprehensible to a human being without having recourse to a decryption operation. By way of example, the library 36 contains a multimedia content 38 such as a film or a piece of music.

The gateway 40 allows the terminal 10 to obtain a licence suitable for allowing it to access a multimedia content for which its user has legally acquired the access rights.

The gateway 40 is for this purpose linked to a recommendation engine 50 and to a licence server 60.

Here, the gateway 40 includes a programmable electronic computer 42 and a memory 44. The computer 42 is capable of executing instructions stored in the memory 44 for implementing the method in FIG. 2.

The memory 44 also contains a list 46 of the users of the system 2. This list 46 contains a description of each of these users and, notably, an identifier for each of the users. This identifier, called user identifier, makes it possible to uniquely identify the user from among the set of users of the system 2. This description also typically includes a description of the access rights of the user to the multimedia content offered by the service.

The memory 44 also contains a list 48 of the terminals of each of the users of the system. This list contains a description of each of the terminals of the user. It therefore notably associates one or more terminal identifiers with each user identifier.

The gateway 40 is capable of maintaining these lists 46 and 48, i.e. of adding, modifying or removing a description.

The recommendation engine 50 is capable of automatically constructing, on the basis of an identifier of a user or of his terminal, a recommendation list for this user. A recommendation list is a list containing a limited number of identifiers of multimedia contents selected from among the set of multimedia contents accessible in the system 2. Each multimedia content identifier uniquely identifies a multimedia content from among the set of multimedia contents accessible in the system 2. The multimedia contents identified by this list each have a higher probability of being accessed by the terminal of the user than the other, unselected, items of multimedia content of the system 2. Typically, each recommendation list includes fewer than N/4 or N/10 or N/100 or else N/1000 multimedia content identifiers, where N is the total number of multimedia content identifiers accessible in the system 2. For example, the recommendation list includes from one to a hundred multimedia content identifiers. Recommendation algorithms making it possible to automatically construct this list are well known and will not be described in detail here. For example, readers may refer to the patent application US 2005/0193414. For this purpose, the engine 50 includes a programmable electronic computer 52 and a memory 54. The computer 52 is capable of executing instructions stored in the memory 54 for implementing the method in FIG. 2. In particular, the memory 54 includes the instructions of the recommendation algorithm. The memory 54 also includes a database 56 making it possible to compute the probability that a given multimedia content will be accessed by a given terminal or user. For this purpose, typically, the database 56 contains for each terminal or each user:

a history containing the identifiers of the multimedia content which this terminal or this user has already accessed in the past, and/or data relating to the user of the terminal 10, such as his age, his sex, his nationality or his belonging to a predetermined category of users.

The user data can be retrieved using the terminal identifier and using the list 48. Indeed, the list 48 makes it possible to retrieve the identifier of the user to whom the terminal belongs on the basis of the terminal identifier. Next, it is possible to consult the description of the user associated by the list 46 with the user identifier found in the list 48.

The licence server 60 is capable of computing and providing a licence allowing a user terminal to access a multimedia content.

The licence server 60 includes for this purpose a memory 64 and a programmable electronic computer 62 capable of executing instructions stored on a storage medium. For this purpose, the computer 62 is attached to the memory 64. This memory 64 includes the instructions needed to implement the method in FIG. 2. These instructions notably include those of an algorithm for computing a licence.

The memory 64 of the licence server 60 contains a list 66 of all the terminals of the system 2. This list contains a description of each of these terminals and, notably, its terminal identifier. This description includes typically at least one cryptographic key $K_T$ specific to each terminal being considered or to a group of terminals of a user. Here, the key $K_T$ is different from one terminal to another.

The memory 64 also contains a list 68 of all the multimedia contents accessible by the terminals in the system 2. This list contains a description of each of these multimedia contents and, notably, the identifier of each multimedia content. Moreover, this list 68 associates with each of the multimedia content identifiers:

the content key $K_c$ used to encrypt this multimedia content, and preferably, predefined rules of access to this multimedia content.

The access rules typically define what a terminal can do with this multimedia content. For example, they are access rules that specify:

the number of times the multimedia content can be accessed, the time period during which it can be accessed, or whether or not the multimedia content can be stored on a storage medium.

The licence server 60 is capable of maintaining these lists 66 and 68, i.e. of adding, modifying or removing a description.

The memory 64 also contains a database 69 of pre-computed access data 69. Here, an access data is a cryptogram $K_c^*$ obtained by encrypting the key $K_c$, associated with a multimedia content by the list 68, with the key $K_T$ of a terminal.

More precisely, the database 69 interassociates a multimedia content identifier, a terminal identifier and the pre-computed access data for the multimedia content and the terminal specified by the two preceding identifiers. Thus, this pre-computed access data notably includes the cryptogram $K_c^*$ obtained by encrypting the key $K_c$, associated by the list 68 with this multimedia content identifier, with the key $K_T$ associated by the list 66 with this terminal identifier.

The architecture of the system for providing content, presented above, has a functional character, and as such is liable to be projected onto multiple technical architectures. Thus, the multimedia content server 30 and the service gateway 40 can reside on one and the same informatic machine or on separate machines. The same goes for the gateway 40, the engine 50 and the licence server 60. Finally, since the gateway 40 groups together all the service logic not relating to the recommendation engine 50 or the licence server 60, its functional analysis is liable to lead to defining functional components thereof that can in turn reside on one and the same informatic machine, each on a separate machine, or, in an intermediate way, in groups on separate machines.

Figure 2:
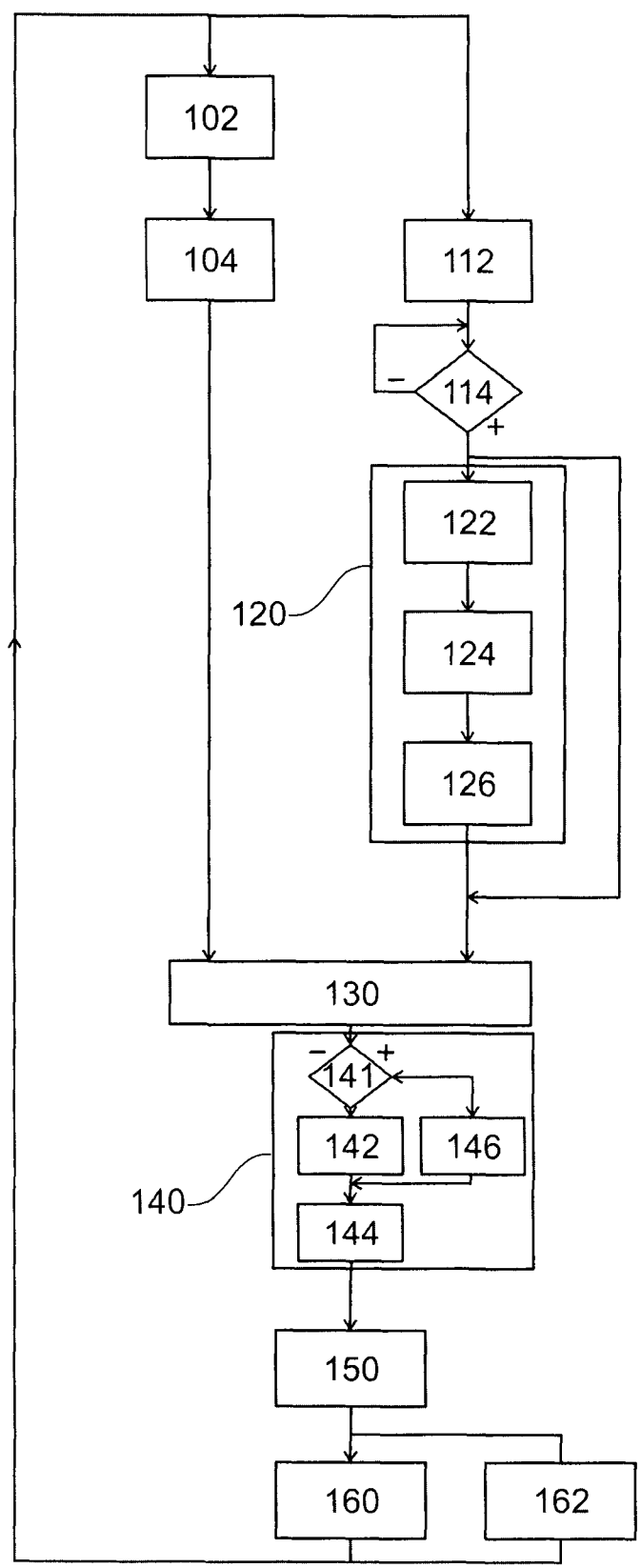
FIG. 2 is a schematic representation of a method for providing a licence in a system for providing multimedia contents.

The operation of the system 2 will now be described with reference to the method in FIG. 2 in the special case where the terminal 10 is used to access the multimedia content 38.

Initially, the terminal 10 connects to the gateway 40 over the network 20. When this connection is established, the identifier 18 of the terminal 10 is transmitted to the gateway 40. In response, the gateway 40 finds in the list 48 the user identifier associated with the identifier 18 and transmits this user identifier to the recommendation engine 50.

Next, in a step 102, the recommendation engine 50 constructs a recommendation list for the user of the terminal 10. The probability that a multimedia content is accessed from the terminal 10 is computed on the basis of the data contained in the database 56. Here, the constructed recommendation list is specific to each user, i.e. it is constructed as a function of the user identifier received. From that moment, normally, the recommendation list varies from one user identifier to another. Once constructed, the recommendation list is transmitted to the gateway 40.

In a step 104, the gateway 40 transmits this constructed recommendation list to the terminal 10. In response, the terminal 10 communicates it to the user by way of its human-machine interface 16. For example, the terminal 10 displays the recommendation list on the screen of the terminal 10. Here, this list is displayed in such a way that the user can easily select a multimedia content identifier from among those displayed. However, if none of the multimedia contents from the recommendation list interests the user, the terminal 10, by way of its human-machine interface 16, allows the user to select the identifier of another multimedia content that is not part of this recommendation list.

Once the user has selected the identifier of a multimedia content that he wishes to access, this identifier is transmitted from the terminal 10 to the gateway 40 by way of the network 20. The gateway 40, in response, transmits a request to the server 60 containing both the identifier of the multimedia content selected by the user and the identifier of the terminal 10. Henceforth, it will be supposed that the selected identifier corresponds to the multimedia content 38.

Thus, in a step 130, the server 60 receives this request.

In response, in a step 140, the server 60 computes a licence containing the information needed to authorize the terminal 10 to access the multimedia content 38. As indicated previously, this licence notably contains at least one access data.

More precisely, the step 140 begins with an operation 141 in which the server 60 searches the database 69 to find out whether the identifier 18 is associated with the identifier of the multimedia content contained in the received request. If the identifier 18 and the identifier 38 are not associated with each other in the database 69, then the server 60 immediately proceeds to an operation 142 of generating the access data corresponding to the identifiers 18 and 38 contained in the request received in the step 130. In particular, in the operation 142, the server 60 constructs the cryptogram $K_c^*$ obtained by encrypting the keys $K_c$ used to encrypt the content 38 with the key $K_T$ of the terminal 10 and using a typically symmetric encryption algorithm, known to both the server 60 and the terminal 10. The key $K_T$ is obtained by searching for the key associated with the identifier 18 in the list 66. The key $K_c$ is itself obtained by searching the list 68 for the content key associated with the identifier 38. Optionally, the access rules associated with this multimedia content 38 by the list 68 can also be extracted to be incorporated into another constructed access data.

Next, in an operation 144, the server 60 finishes the computing of the licence by incorporating into it additional data such as a nonce making it possible to avoid replay attacks or a licence expiry date computed on the basis of the date of receipt of the request.

If during the operation 141, the server 60 determines that the identifier 18 and the identifier 38 are associated with each other in the database 69, then instead of proceeding with the operation 142, the server 60 proceeds immediately to an operation 146.

In the operation 146, the server 60 automatically selects the pre-computed access data associated, in the database 69, with both the identifier 18 and the identifier 38. Next, the server 60 proceeds with the operation 144. However, in this case, in the operation 144, the pre-computed access data are used instead of those constructed in the operation 142. Thus, when the operation 146 is executed, the operation 142 is not. From that point onwards, the execution of the step 140 is much faster since no operation of encrypting the key $K_c$ with the key $K_T$ is executed. The server 60 is therefore capable of processing far more requests in the same time with the same hardware resources as compared to the situation where no access data is pre-computed.

The pre-computing of the items of access data is done before the step 130, in steps 112, 114 and 120 which are described in detail further on.

Once the computing of the licence has ended, in a step 150, the server 60 transmits the licence to the gateway 40 which transmits it in turn to the terminal 10.

In a step 160, the terminal 10 receives the computed licence. In response, it decrypts the cryptogram $K_c^*$ with its key $K_T$ to extract the key $K_c$.

In parallel, in a step 162, the terminal 10 downloads the multimedia content 38 from the server 30 and over the network 20. Next, once this download has ended, it accesses the multimedia content 38. To do so, the terminal 10 decrypts the multimedia content 38 with the key $K_c$ extracted from the received licence in such a way as to obtain the multimedia content 38 in clear. Next, the multimedia content 38 in clear is played on the human-machine interface 16 of the terminal 10 in such a way that it is directly perceptible and comprehensible to a human being.

For example, the step 112 is initiated when the licence server 60 receives from the gateway 40 a list of identifiers of new users of the system, a list of identifiers of new user terminals, a list of identifiers of multimedia content newly accessed by user terminals, a list of identifiers of unsubscribed users, or a list of identifiers of unsubscribed terminals. When a user or a terminal is unsubscribed, it is because it is no longer part of the system 2.

The novelty runs here from the last implementation of the step 112. The step 112 is for example implemented, automatically or under the initiative of the service operator, on a continuous-flow basis, i.e. as users or user terminals are stored and unsubscribed, and as user terminals access multimedia content.

In this step 112, in the event of it receiving a list of identifiers of new user terminals or of unsubscribed terminals, the licence server 60 adds to or removes from its list 66 the description of each of these terminals.

In this step 112, in the event of it receiving a list of identifiers of multimedia content newly accessed by user terminals or removed from the server 30, the licence server 60 adds to or removes from its list 68 the description of each of these multimedia contents.

In this step 112 the licence server 60 updates a list of the users active since the last triggering of the step 120. This list contains the identifiers of the new users of the system, the identifiers of the users of the new terminals, and the identifiers of the users of the terminals having newly accessed at least one multimedia content. The identifiers of the unsubscribed users are removed from this list.

Next, in a step 114, the licence server 60 computes its own workload as a function of the number of requests that it has received over a given time interval, and of the duration of this time interval. The requests in question are those received during the iterations of the step 130 for all the terminals of the system 2. This time interval has for example the current date for end date, and a predetermined duration of a few minutes to a few hours. It could for example be the last five minutes elapsed or the last half-hour elapsed. Of course, any other time interval can be taken into account, notably as a function of the expected period of the fluctuations in the workload. The workload of the licence server 60 is for example evaluated as the number of requests received during the time interval divided by the duration of this time interval. Any other method of evaluating this workload available to those skilled in the art can however be applied, of course.

In the step 114, the licence server 60 next inhibits or triggers the step 120. The decision is taken as a function of the computed workload. Typically, if the computed workload is low enough, the step 120 is triggered, and otherwise it is inhibited. For example, a threshold S1 is fixed beforehand and the step 120 is triggered if the computed workload is below this threshold S1 and, in the opposite case, inhibited.

To trigger the step 120, the licence server 60 transmits to the recommendation engine 50 at least one of the elements from the list of active users of the system, and removes the transmitted elements from this list.

In the step 120, the licence server 60 pre-computes the licences.

For this purpose, in an operation 122, the recommendation engine 50 produces a recommendation list for each terminal of the active users of the system whose identifier it has received. Here, each recommendation list is constructed using the same recommendation algorithm and the same database 56 as those used in the step 102. Thus, each recommendation list includes, preferably, over 50%, and generally over 80%, of multimedia content identifiers in common with the list constructed for the same user in a later execution of the step 102. However, the lists constructed in the step 102 and in the operation 122 for the same user may not be rigorously identical, for example, because the database 56 has been modified between the executions of the operation 122 and the step 102.

Here, the engine 50 then returns each of these recommendation lists to the licence server 60, and not, as in conventional use, to the gateway 40 for display by a terminal of the user in question.

Next, in an operation 124, the licence server 60 selects, from at least one of the received recommendation lists and, typically, from each received recommendation list, at least one multimedia content identifier. The selection method used here is a design choice essentially guided by the size of the recommendation lists produced by the engine 50 and by the computing capacities of the licence server 60. For example, all the multimedia content identifiers of each recommendation list received are selected, a fixed number of them, or a number depending on the workload of the licence server 60, previously computed.

Next, in an operation 126, the licence server 60 pre-computes, for each selected identifier, the access data allowing the terminal of the user in question to access the multimedia content of the selected identifier.

The licence server 60 then stores in the database 69, in relation to the identifier of the selected multimedia content and the identifier of the user terminal being considered, the pre-computed access data.

Many other embodiments of the invention are possible. For example, the association of one terminal with one user is dynamic, for example resulting from the connection, by means of the terminal, of the user to the service.

In a variant, the user identifier transmitted to the recommendation engine 50 is replaced by the identifier 18 of the terminal of this user. In this embodiment, the recommendation list is constructed for each terminal identifier and not for each user.

In another embodiment, the multimedia content can be provided by the system for providing multimedia contents, encrypted with several keys in conformance with its protection by the digital rights management system. Several licences, each containing at least one of these content keys, can then be necessary for the terminal to access the multimedia content. The method claimed then applies to at least one of these licences.

Alternatively, the multimedia content can be provided protected by a digital rights management system without, however, being encrypted. The content key then does not appear among the access data inserted into the licence.

In another embodiment, the multimedia content is provided protected by a conditional access system, or CAS. The terminology of the field of conditional access systems is then used. Readers interested in this subject can for example find a more comprehensive description in the document: "Functional Model of a Conditional Access System", EBU Review, Technical European Broadcasting Union, Brussels, BE, N° 266, 21 Dec. 1995. The method claimed then applies to the provision of control words encrypted with the terminal key $K_T$ or EMMs needed to route the rights or the exploitation keys, notably.

In another embodiment, the multimedia content can also be provided, by the system, protected by any other type of content protection system, such as for example a more conventional data protection system not performing access rights management. The method claimed then applies to the provision of the messages needed to route the encryption keys, for example.

In another embodiment, the network 20 is any long-distance information distribution network other than the Internet network, offering a connected or disconnected two-way link between the terminals and the gateway 40.

Alternatively, the terminals are linked to the content server 30 and to the service gateway 40, by two separate respective networks, of the same character or not.

The various lists described previously can be stored and maintained in various ways. For example, the list 46 of the users of the system and the list 48 of the terminals of each of them, are contained in, and maintained by, a client management sub-system separate from the gateway 40, or even integrated into the licence server 60.

In a variant, the access data is only an access rule associated with the multimedia content and terminal in question.

In another variant, the key $K_T$ is common to a group of terminals and not specific to one single terminal. However, even in this case, the number of terminals belonging to this group is 100 or 1000 or 10000 times smaller than the total number of terminals of the system 2.

In another embodiment, the step 112 is initiated when the licence server 60 detects that a given duration has elapsed since the last triggering of the step 120. This embodiment is that of a periodic triggering of the pre-computing step 120.

In another embodiment, in the step 114, to trigger the step 120, the licence server 60 transmits to the recommendation engine 50 at least one of the elements from the list of active users of the system, by way of the gateway 40.

In another embodiment, the step 114 is executed by any component of the system separate from the licence server 60, for example by the gateway 40.

In a variant, in the step 114, the trend of the last few computed values of the workload of the licence server 60 is taken into account, in addition to its last computed value, for deciding the inhibition or the triggering of the step 120. For example, as a function of the computing resources of the licence server 60 remaining available and the resources estimated necessary for the execution of the step 120, the decision can be taken to inhibit or to trigger the step 120 for certain users only from among those who are a priori concerned, according to their number, or any other data item relating to them contained in the system. Any other method of decision available to those skilled in the art can however be applied of course.

Alternatively, the step 114 is omitted.

The recommendation algorithms used for constructing the recommendation lists in the step 102 and in the operation 122 are not necessarily the same. The database used for this during the operation 122 can also be different to the database 56. However, even in these cases, the number of multimedia content identifiers common to the lists constructed for the same user in the step 102 and in the operation 122 has a strong chance of being high since these two algorithms both have the same objective, namely identifying the multimedia contents that have the most chance of being accessed by the user.

In the case where all the data needed to compute a complete licence is already known before receiving a request for this licence in the step 130, then, in the operation 126, the licence server 60 can compute, i.e. pre-compute, then store in the memory in relation to the identifier of the selected multimedia content and to the identifier of the terminal in question of the user, the entire licence. In this case, at the end of the operation 146, the method continues directly with the step 150.

The invention claimed is:

1. In a system for providing multimedia content, a method comprising the non-abstract computation of a license that allows a terminal of a user of the system to access multimedia content, the license being dependent both on an identifier of the multimedia content and on an identifier of the terminal or of the user, wherein the non-abstract computation of the license comprises causing a license server to execute the non-abstract steps of:

obtaining a recommendation list for the user, the first recommendation list having been constructed using a database of pre-stored data on the basis of which it is possible to compute a probability that any multimedia content available in the system will be accessed by the terminal of the user, wherein the recommendation list comprises content identifiers, each of which identifies an item of multimedia content that has been selected from multimedia content that is available in the system, wherein the content identifiers in the recommendation list identify items of multimedia content that have a higher probability of being accessed by the user's terminal than items of multimedia content that are identified by content identifiers that have been excluded from the recommendation list, pre-computing access data for automatically-selected content identifiers from the recommendation list, wherein pre-computing the access data comprises, for each of the automatically-selected content identifiers, pre-computing an item of access data for enabling the user's terminal to access the item of multimedia content that is identified by that content identifier, the item of access data including a content key that is required for decrypting the first item of multimedia content, receiving, from the user, a first request, the first request being a request for a first item of multimedia content, searching the pre-computed access data to identify a pre-computed item of access data for the first item of multimedia content, retrieving, from the pre-computed access data, a pre-computed item of access data for the first item of multimedia content, using the pre-computed item of access data, computing a first license, the first license being a license to access the first item of multimedia content, providing the first license to the user's terminal, receiving, from the user, a second request, the second request being a request for a second item of multimedia content, searching the pre-computed access data to identify a pre-computed item of access data for the second item of multimedia content, after determining that no such item of pre-computed access data exists, computing the access data for the second item of multimedia content, using the computed access data, computing a second license, the second license being a license to access the second item of multimedia content, and providing the second license to the user's terminal, wherein the method further comprises receiving a list of identifiers of new users of the system, the list including the identifier of the user and triggering execution of the step of pre-computing access data.

2. The method according to claim 1, further comprising, prior to receiving either the first or second request, causing the license server to execute the step of transmitting the recommendation list to the user's terminal, wherein the transmitted recommendation list includes at least one of the automatically-selected content identifiers and causing the user's terminal to execute the step of displaying, the recommendation list in such a way as to favor the user's selection of multimedia content that is identified by one of the automatically-selected content identifiers.

3. The method according to claim 1, further comprising, at the user's terminal, receiving the license and using the license to access the multimedia content.

4. The method according to claim 1, further comprising determining that the workload of the license server as a function of the number of requests to be processed by the license server over a time interval and of the duration of the time interval and determining that the determined workload exceeds a threshold, continuing serving licenses to users, and inhibiting execution of the step of pre-computing the access data.

5. A manufacture comprising a non-transitory computer-readable medium having encoded thereon instructions for causing an electronic computer of a license server to execute a method comprising the non-abstract computation of a license that allows a terminal of a user of the system to access multimedia content, the license being dependent both on an identifier of the multimedia content and on an identifier of the terminal or of the user, wherein the non-abstract computation of the license comprises causing the electronic computer of the license server to execute the non-abstract steps of:

obtaining a recommendation list for the user, the first recommendation list having been constructed using a database of pre-stored data on the basis of which it is possible to compute a probability that any multimedia content available in the system will be accessed by the terminal of the user, wherein the recommendation list comprises content identifiers, each of which identifies an item of multimedia content that has been selected from multimedia content that is available in the system, wherein the content identifiers in the recommendation list identify items of multimedia content that have a higher probability of being accessed by the user's terminal than items of multimedia content that are identified by content identifiers that have been excluded from the recommendation list, pre-computing access data for automatically-selected content identifiers from the recommendation list, wherein pre-computing the access data comprises, for each of the automatically-selected content identifiers, pre-computing an item of access data for enabling the user's terminal to access the item of multimedia content that is identified by that content identifier, the item of access data including a content key that is required for decrypting the first item of multimedia content, receiving, from the user, a first request, the first request being a request for a first item of multimedia content, searching the pre-computed access data to identify a pre-computed item of access data for the first item of multimedia content, retrieving, from the pre-computed access data, a pre-computed item of access data for the first item of multimedia content, using the pre-computed item of access data, computing a first license, the first license being a license to access the first item of multimedia content, providing the first license to the user's terminal, receiving, from the user, a second request, the second request being a request for a second item of multimedia content, searching the pre-computed access data to identify a pre-computed item of access data for the second item of multimedia content, after determining that no such item of pre-computed access data exists, computing the access data for the second item of multimedia content, using the computed access data, computing a second license, the second license being a license to access the second item of multimedia content, and providing the second license to the user's terminal, wherein the instructions further comprise instructions for causing the electronic computer of the license server to carry out steps of receiving a list of identifiers of new users of the system, the list including the identifier of the user and triggering execution of the step of pre-computing access data.

6. An apparatus comprising a license-server, said license-server comprising an electronic computer programmed to execute non-abstract computation of a license that allows a terminal of a user of the system to access multimedia content, the license being dependent both on an identifier of the multimedia content and on an identifier of the terminal or of the user, wherein the non-abstract computation of the license comprises the steps of:

obtaining a recommendation list for the user, the first recommendation list having been constructed using a database of pre-stored data on the basis of which it is possible to compute a probability that any multimedia content available in the system will be accessed by the terminal of the user, wherein the recommendation list comprises content identifiers, each of which identifies an item of multimedia content that has been selected from multimedia content that is available in the system, wherein the content identifiers in the recommendation list identify items of multimedia content that have a higher probability of being accessed by the user's terminal than items of multimedia content that are identified by content identifiers that have been excluded from the recommendation list, pre-computing access data for automatically-selected content identifiers from the recommendation list, wherein pre-computing the access data comprises, for each of the automatically-selected content identifiers, pre-computing an item of access data for enabling the user's terminal to access the item of multimedia content that is identified by that content identifier, the item of access data including a content key that is required for decrypting the first item of multimedia content, receiving, from the user, a first request, the first request being a request for a first item of multimedia content, searching the pre-computed access data to identify a pre-computed item of access data for the first item of multimedia content, retrieving, from the pre-computed access data, a pre-computed item of access data for the first item of multimedia content, using the pre-computed item of access data, computing a first license, the first license being a license to access the first item of multimedia content, providing the first license to the user's terminal, receiving, from the user, a second request, the second request being a request for a second item of multimedia content, searching the pre-computed access data to identify a pre-computed item of access data for the second item of multimedia content, after determining that no such item of pre-computed access data exists, computing the access data for the second item of multimedia content, using the computed access data, computing a second license, the second license being a license to access the second item of multimedia content, and providing the second license to the user's terminal, wherein the electronic computer is further programmed to execute the steps of receiving a list of identifiers of new users of the system, the list including the identifier of the user and triggering execution of the step of pre-computing access data.

7. The method according to claim 1, further comprising triggering execution of pre-computing access data in response to receiving a list of identifiers of new terminals of the user.

8. The method according to claim 1, further comprising triggering execution of pre-computing access data in response to receiving a list of identifiers of content that has been newly accessed by the user.

9. The method according to claim 1, further comprising triggering execution of pre-computing access data in response to receiving a list of identifiers of users that have unsubscribed from the system.

10. The method according to claim 1, further comprising triggering execution of pre-computing access data in response to receiving a list of identifiers of terminals that have unsubscribed from the system.

11. The method according to claim 1, further comprising computing the workload of the license server as a function of the number of requests to be processed by the license server over a time interval and of the duration of the time interval and triggering execution of the step of pre-computing the access data if the computed workload falls below a threshold.

\* \* \* \* \*